(12) United States Patent
Gassmann et al.

(10) Patent No.: US 7,946,402 B2
(45) Date of Patent: May 24, 2011

(54) MOTOR VEHICLE HYDRAULIC PUMP

(75) Inventors: Theodor Gassmann, Siegburg (DE);
Josef Bachmann, Obersinn (DE);
Bernhard Terfloth, Remscheid (DE);
Rolf Schwarze, Aalen (DE)

(73) Assignee: GKN Driveline International GmbH, Lohmar (DE)

( * ) Notice: Subject to any disclaimer, the term of this patent is extended or adjusted under 35 U.S.C. 154(b) by 477 days.

(21) Appl. No.: 11/865,594

(22) Filed: Oct. 1, 2007

(65) Prior Publication Data

US 2008/0277239 A1 Nov. 13, 2008

Related U.S. Application Data

(63) Continuation of application No. PCT/EP2006/000980, filed on Feb. 4, 2006.

(30) Foreign Application Priority Data

Mar. 31, 2005 (DE) .......................... 10 2005 014 654

(51) Int. Cl.
*F16D 25/12* (2006.01)
*F16D 13/74* (2006.01)
(52) U.S. Cl. .............. 192/85.61; 192/85.63; 192/113.34
(58) Field of Classification Search ............... 192/85.61; 418/10
See application file for complete search history.

(56) References Cited

U.S. PATENT DOCUMENTS

| 2,223,070 | A | * | 11/1940 | Kleckner | .......................... 418/10 |
| 3,692,432 | A | * | 9/1972 | Liang et al. | .................... 417/286 |
| 4,718,308 | A | * | 1/1988 | Haley | .............................. 477/39 |
| 5,105,922 | A | * | 4/1992 | Yant | .............................. 192/3.58 |
| 6,195,990 | B1 | | 3/2001 | Machesney et al. | |
| 6,264,451 | B1 | | 7/2001 | Murayama et al. | |
| 6,374,603 | B1 | | 4/2002 | Morita et al. | |
| 6,386,836 | B1 | * | 5/2002 | Johnson | ........................ 417/310 |
| 6,398,531 | B1 | | 6/2002 | Andres et al. | |
| 2005/0235637 | A1 | | 10/2005 | Muller et al. | |

FOREIGN PATENT DOCUMENTS

| DE | 10150598 A1 | 4/2003 |
| DE | 10216002 A1 | 5/2003 |
| DE | 10350631 A1 | 6/2005 |
| EP | 0811765 A2 | 12/1997 |
| EP | 1371868 A1 | 12/2003 |

* cited by examiner

Primary Examiner — Richard M. Lorence
(74) *Attorney, Agent, or Firm* — Rader, Fishman & Grauer, PLLC

(57) ABSTRACT

A motor vehicle hydraulic pump (1) is provided comprising a gerotor rotor set or planetary rotor set and at least two output stages. A first output stage (10) of the hydraulic plump (1) is connected to a lubricant, in particular, a clutch lubricant. A second output stage (11) of the hydraulic pump (1) is connected to at least one clutch (2) of the actuation thereof. The invention also provides a method for actuating at least one clutch which is arranged in the motor vehicle by means of a motor vehicle hydraulic pump, whereby an inter-connection of a volume flow outlet of the first step (10) and the second step (11) of the hydraulic pump (1) takes place according to requirements for actuating the clutch.

11 Claims, 7 Drawing Sheets

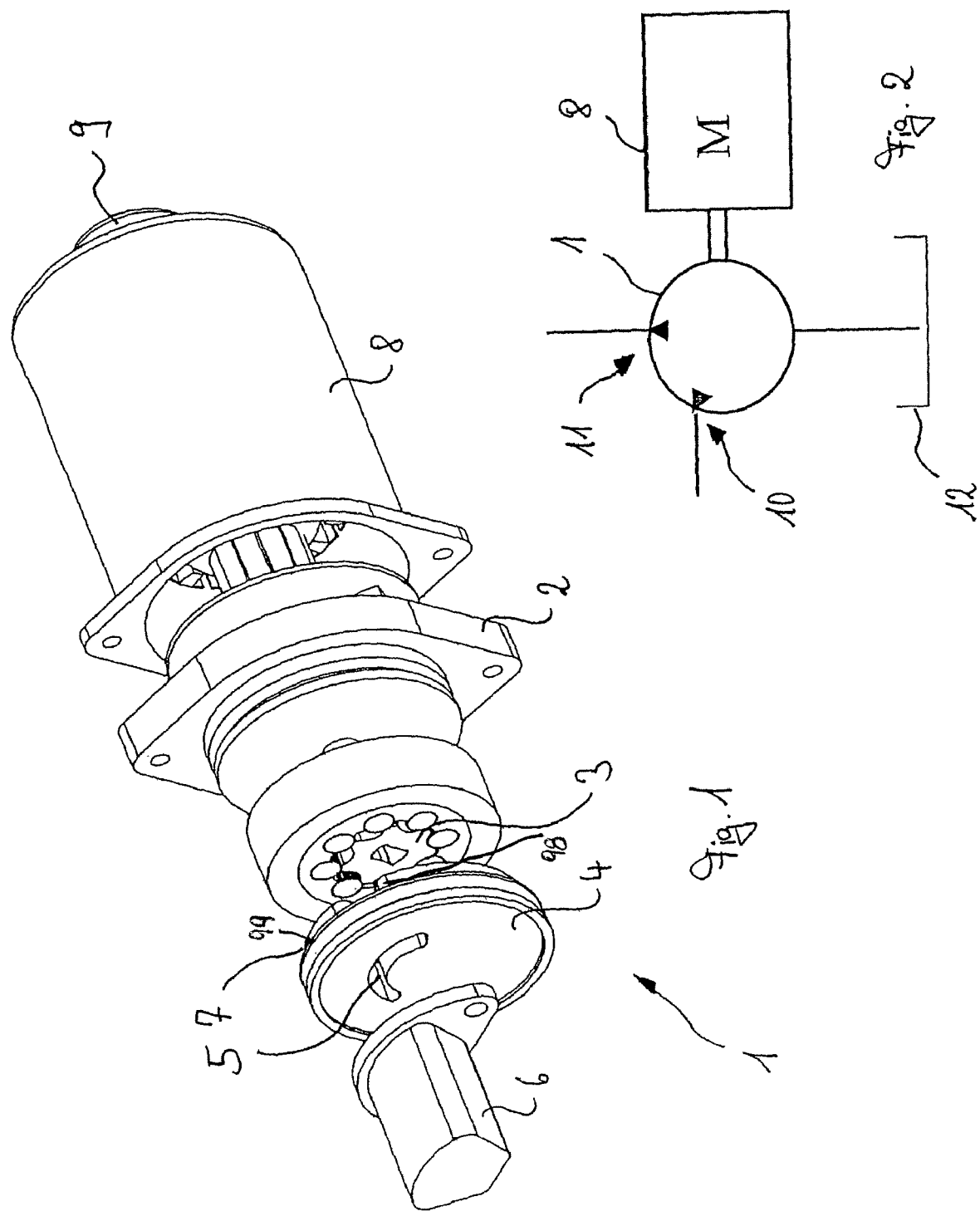

MOTOR VEHICLE HYDRAULIC PUMP

CROSS REFERENCE TO RELATED APPLICATION

This application is a continuation of and claims the benefit of PCT Application No. PCT/EP2006/000980 filed on Feb. 4, 2006 entitled "Motor Vehicle Hydraulic Pump" which claims priority from German Application No. 10 2005 014 654.6-15 filed on Mar. 31, 2005.

TECHNICAL FIELD

The present invention concerns a motor vehicle hydraulic pump for actuating a clutch, wherein the hydraulic pump has a gerotor or planetary rotor set.

BACKGROUND

In motor vehicles it is known for a clutch to be activated by means of a hydraulic actuator. The hydraulic fluid required for this purpose is brought to the necessary pressure level and the required delivery volume by means of a hydraulic pump. To this end, the hydraulic pump is generally designed such that it is matched to the maximum possible volume demand of a clutch that occurs when the clutch is actuated. This requires an especially large hydraulic pump, although it is operated only briefly at maximum design capacity.

SUMMARY OF THE INVENTION

A hydraulic pump assembly for use in a motor vehicle is provided capable of reducing the resources used in actuating the clutch while at the same time providing an efficient hydraulic fluid supply.

A motor vehicle hydraulic pump is provided with the features of claim 1, as well as with a method for actuating at least one motor vehicle clutch with the features of claim 10. Additional advantageous embodiments and further developments are specified in the applicable dependent claims.

According to the invention, a motor vehicle hydraulic pump is proposed for actuating a clutch wherein the hydraulic pump has a gerotor or planetary rotor set, and the hydraulic pump has at least two output stages. According to a first embodiment, a first output stage of the hydraulic pump has a connection to a lubrication system and, in particular, to a clutch lubrication system. According to another embodiment, a second output stage of the hydraulic pump has a connection to at least one clutch for actuating the same. It is possible in this way to achieve, in particular, utilization of a pressure gradient within the hydraulic pump matched to a different application purpose. While hydraulic fluid with a first pressure level that is lower than that of the second output stage is diverted in the first output stage, preferably the delivery volume taken from the first output stage has a greater flow rate than the delivery volume taken from the second output stage. The hydraulic fluid taken from the second output stage is preferably applied to an actuating device, preferably an actuating piston of a clutch. The hydraulic fluid taken from the first output stage is preferably used for lubrication of a friction clutch unit, to which hydraulic fluid for actuation is applied through the second output stage, for example.

A further development makes provision that a common reservoir with hydraulic fluid is provided for a clutch lubrication system and for an actuator for the clutch. This makes it possible to provide a combined hydraulic circuit for a hydraulic actuator for the clutch as well as for a lubrication system for the same. In particular, this makes it possible in a second embodiment to omit an additional lubricating pump that can additionally be provided in a first embodiment.

In addition to the first and second output stages, the hydraulic pump can also have one or more additional stages from which hydraulic fluid can be drawn for a wide variety of purposes. In particular, a multi-stage hydraulic pump makes it possible to divert hydraulic fluid with different pressure levels and delivery volumes. In this way, a clutch or a lubrication system can be connected to different stages as needed.

Another embodiment provides for the first and second output stages to be connected to one another. In particular, this makes it possible to briefly combine the hydraulic fluid diverted from the first and second output stages. This is advantageously used to produce a common feed for actuating at least one clutch. The connection of the first and second output stages is accomplished by means of an electromagnetically actuated valve, for example. If a high volumetric delivery is required for rapid actuation of the clutch, the first and second output stages are interconnected by means of the switchable valve. By this means, the resulting total volume flow of the hydraulic pump is available for an initially high volume demand of, for example, the actuating piston of a friction clutch unit. When the volume demand of the actuating piston decreases, the larger fluid volume of the first output stage is once again routed to the lubrication system of the clutch unit. Only a volume flow from the second output stage is used for further actuation of the clutch. At this point in time, the lubrication circuit and an actuating circuit for the clutch operate at different pressures. A separation of the volume flows can take place in an abrupt, linear, or stepwise manner, as well as according to a continuous curve.

At the time when the first and second output stages are interconnected, the total volume flow preferably has the pressure that is imposed by the first output stage. To this end, the higher pressure from the second output stage, for example, is decreased, preferably through a pressure relief line or throttling device. Also usable for pressure reduction is a volume into which hydraulic fluid flows and which at the same time provides a pressure drop to the pressure level of the first output stage. It is also possible for the pressure of the total volume flow to be reduced to a pressure below that of the first output stage.

When more than two stages are used in the hydraulic pump, it is possible to form a total volume flow from two and more stages. Once the initial high volume demand of, for example, the actuating piston of the clutch, is satisfied, individual stages can be sequentially disconnected from the total volume flow either individually or together.

A further development provides that an accumulator is coupled to the hydraulic pump, preferably being directly connected to the clutch circuit. By means of the hydraulic pump, the accumulator can be filled with hydraulic fluid under high pressure from a final stage of the hydraulic pump, for example. The hydraulic fluid contained in the accumulator can be used, firstly, to supply an additional volume flow for the actuator circuit of the clutch when the clutch is actuated. Secondly, the stored hydraulic fluid can be used as an emergency reserve. For example, in the event that the hydraulic pump fails, hydraulic fluid can be drawn from the accumulator for at least one, and preferably multiple, clutch actuations. It is also possible to ensure emergency lubrication in the lubrication circuit with hydraulic fluid from the accumulator. The accumulator may be a diaphragm accumulator, bladder accumulator or piston accumulator, for example.

The hydraulic pump is preferably operated by an electric motor. The electric motor used for this purpose is preferably connected directly to the hydraulic pump without a gearbox between them. However, a step-up gearbox can also be present. The electric motor is preferably speed-controlled. The pump volume can thus be set by regulating the motor speed. It is also possible for the hydraulic circuit to be equipped with one or more pressure regulating valves or one or more throttling devices, for example, by means of which the pressure level or the volume flow for the clutch circuit or the lubrication circuit can be set to match the demand. The lubrication circuit and the clutch circuit are connected to one another by the hydraulic pump and a common reservoir for the hydraulic fluid that is used in both circuits.

Another embodiment provides that multiple clutches are supplied with hydraulic fluid for actuation by the hydraulic pump. In particular, it is also possible for not one, but at least two, hydraulic pumps to be arranged in the lubrication circuit or clutch circuit. It is possible for the hydraulic pumps to be connected to one another in parallel or in series. It is also possible for at least one hydraulic pump to be switchable from operation in series to operation in parallel with another hydraulic pump. This can take place as a function of the required pressure level or in accordance with the required volume flow. Different types of hydraulic pump can also be connected to one another.

In accordance with a first example, demand-based hydraulic supply, in particular to the clutch or the actuator for the clutch, such as the actuating piston of the clutch, for example, takes place through at least one pressure regulating valve. According to a second example, it is possible to use pulsed cutoff valves by which means an actuating pressure that is present at the actuating piston can be at least controlled or regulated. In both the first and second examples, it is possible for the delivery volume of the hydraulic pump to be set by the speed of the electric motor. This achieves the result that the delivery volume and the pressure can each be set independently of the other. In another embodiment, a throttling device is provided at the actuating piston of the clutch, for example. Here, the actuating pressure can be regulated directly by the volume flow of the hydraulic pump and thus by the speed of the electric motor. Delivery volume and actuating pressure are thus coupled.

Other advantages and features of the invention will become apparent to one of skill in the art upon reading the following detailed description with reference to the drawings illustrating features of the invention by way of example.

BRIEF DESCRIPTION OF THE DRAWINGS

For a more complete understanding of this invention, reference should now be made to the embodiments illustrated in greater detail in the accompanying drawings and described below by way of examples of the invention.

FIG. 1 is an example of a hydraulic pump.

FIG. 2 is a block diagram of a two-stage hydraulic pump.

DETAILED DESCRIPTION

Figure 3:
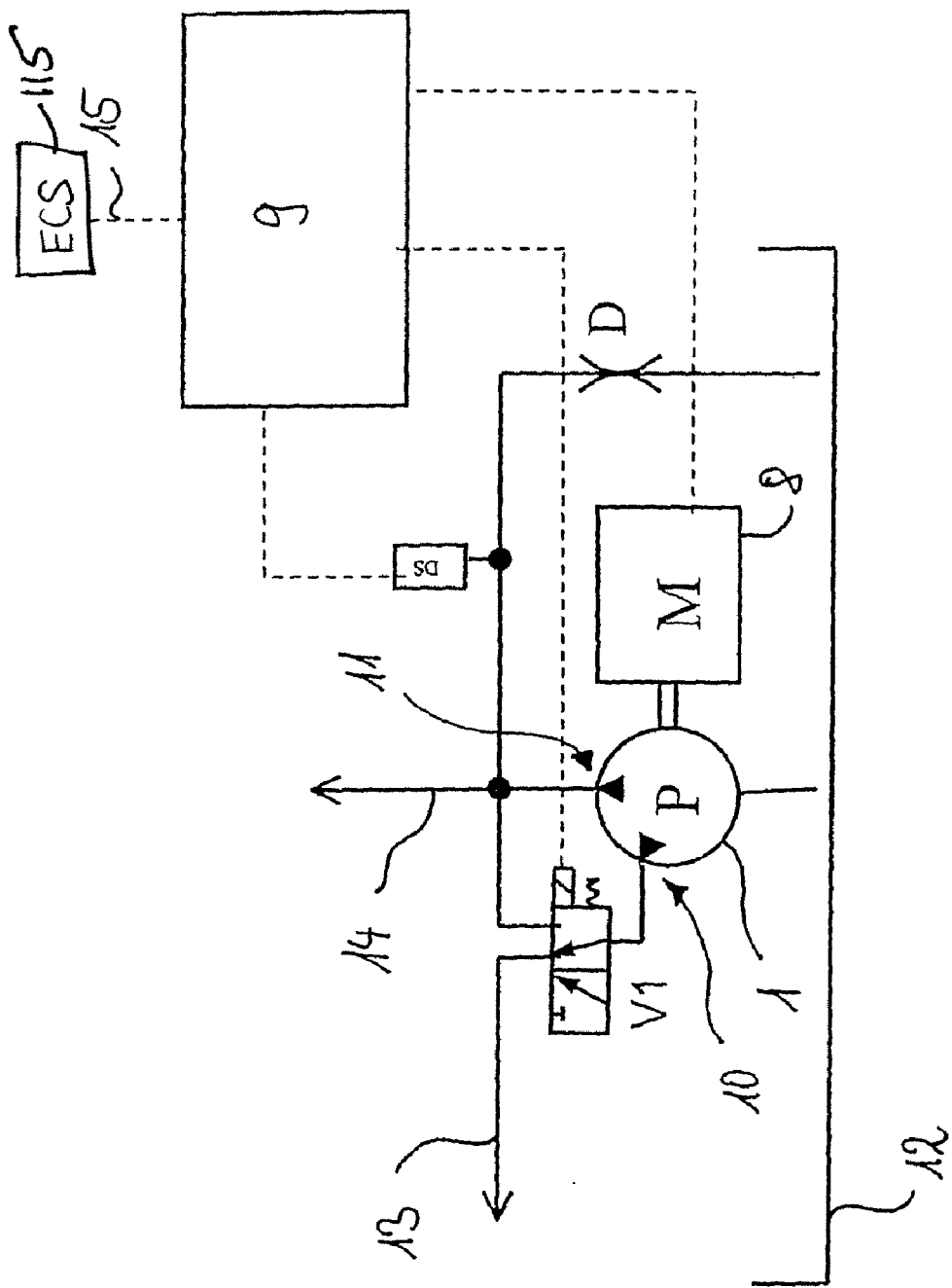
FIG. 3 is a hydraulic circuit for a clutch with integrated hydraulic pump.

FIG. 1 shows an example of a motor vehicle hydraulic pump 1 designed according to the invention, in an exploded view. The motor vehicle hydraulic pump 1 is preferably a single component that other elements or assemblies are attached to, in particular are flange-mounted to. The hydraulic pump 1 shown has a pump housing 2, which is connected to a gerotor set 3. An intake cover 4 sits on the gerotor set 3. Arranged in the intake cover 4 is an intake line 5 through which hydraulic fluid is drawn into the pump. The hydraulic fluid is filtered before entry into the hydraulic pump 1. A filter 6, which is preferably fastened directly to the intake cover 4, is provided for this purpose. A pump housing 7 is in turn attached to the intake cover 4. The pump housing 7 is located opposite the gerotor set 3. A first outlet 99 and a second outlet 98 are provided in the pump housing 7. The two outlets of the hydraulic pump 1 constitute the respective stages of the hydraulic pump 1. The first outlet forms the first output stage, while the second outlet forms the second output stage. A high volume flow can be drawn from the hydraulic pump 1 through the first output stage, and thus the first outlet. In contrast, hydraulic fluid at high pressure is obtained from the second output stage, and thus through the second outlet. The hydraulic pump 1 is coupled to an electric motor 8, wherein the gerotor 3 is preferably connected directly to the rotor of the electric motor. By this means, a speed-controlled motion of the rotor can be transmitted directly to the gerotor 3. The electric motor 8 is preferably at least controlled, in particular regulated. To this end, a control unit 9 can be provided, either directly on the electric motor 8 or in its immediate vicinity. The control unit is connected to an engine control system of the motor vehicle, in particular by a bus system, preferably a CAN bus.

In the discussion that follows, components that are identical or are of the same type are provided with like reference symbols.

FIG. 2 shows a schematic view of the structure of the hydraulic pump 1 in a two-stage design. A first output stage 10 is located ahead of a second output stage 11. Both stages 10, 11 obtain hydraulic fluid from a common reservoir 12. The reservoir 12 is, preferably, an oil sump. The filter 6 from FIG. 1 can be set directly into this oil sump, for example. A lubrication circuit is preferably supplied by the first output stage 10. An actuating device for a clutch of the motor vehicle is preferably supplied by the second output stage 11. The electric motor 8 is directly coupled to the hydraulic pump 1.

FIG. 3 shows a schematic view of a hydraulic circuit for a clutch of a motor vehicle with a lubrication circuit 13 and a clutch circuit 14. The lubrication circuit 13 and clutch circuit 14 are each shown only in part. The hydraulic pump 1 pumps hydraulic fluid from the reservoir 12. The hydraulic pump 1 is driven by the electric motor 8 for this purpose. The electric motor 8 is connected to a control unit 9. This and other connections of the control unit are shown with dashed lines. The control unit 9 is also coupled to a first valve V1. The first valve V1 is a 3/2-port directional control valve that is operated by an electromagnet and can be moved to a neutral position by a spring. The first valve V1 is a reversing valve between the lubrication circuit 13 and the clutch circuit 14. When the electromagnet of the first valve V1 is actuated by the control unit 9, the volume flow originating from the first output stage 10 for the lubrication circuit 13 is fed to the clutch circuit 14.

The lubrication circuit 13 and the clutch circuit 14 are preferably designed in accordance with their respective tasks of lubrication and actuation of a clutch, in particular a friction clutch, as regards their respective delivery volumes and delivery pressures. However, it is possible to connect the two circuits 13, 14 together by actuating the first valve V1. This is preferably done when actuating a clutch. The clutch preferably has an actuating piston that must overcome a clutch play. A relatively large quantity of fluid is needed for this purpose. In order to permit rapid actuation of the clutch, a large volume flow may be necessary. On the one hand, this large volume flow could be accomplished by appropriately designing the second output stage 11 of the hydraulic pump 1. However, by appropriately interconnecting the two circuits 13, 14, the volume flow from the first output stage 10 is added to that of the second output stage. This makes it possible to more rapidly overcome plate play in a friction clutch. This permits faster actuation of the clutch. In the further course of the actuation of the clutch, the volume flow demand of the actuating piston drops sharply as pressure increases. At a predefinable pressure, chosen in particular as a function of the electric motor and hydraulic pump 1 used, the two hydraulic circuits 13, 14 are separated again by the first valve V1. After this point in time, the actuating piston is subjected only to hydraulic fluid from the second output stage 11, and thus is under higher pressure. To this end, the control unit 9 has a coupling to a pressure sensor DS. The pressure sensor DS is preferably located in the clutch circuit 14 or in a line connected thereto so as to be able to sense the pressure prevailing directly at or in the immediate vicinity of the actuating piston. The pressure signal from the pressure sensor DS is forwarded to the control unit 9. The latter can actuate the first valve V1, either autonomously or in coordination with an engine control system that is not shown, and return it to an initial position to allow the circuits 13, 14 to be separated again. The control unit 9 and the engine control system 115 are preferably connected through a bus system 15. The control unit 9 can influence the speed of the electric motor 8, either independently of the engine control device 115 or in coordination with the engine control device. The pressure behavior in the clutch circuit 14 is influenced by the second output stage 11 and also by a throttling device D. The throttling device D presents a flow resistance in the clutch circuit 14, so that the fluid flowing out of the hydraulic pump 1 into the clutch circuit 14 can exert pressure on the actuating device of the clutch, while drainage into the reservoir 12 is also ensured. A circuit for the clutch circuit 14 is closed by this means, for example.

Figure 4:
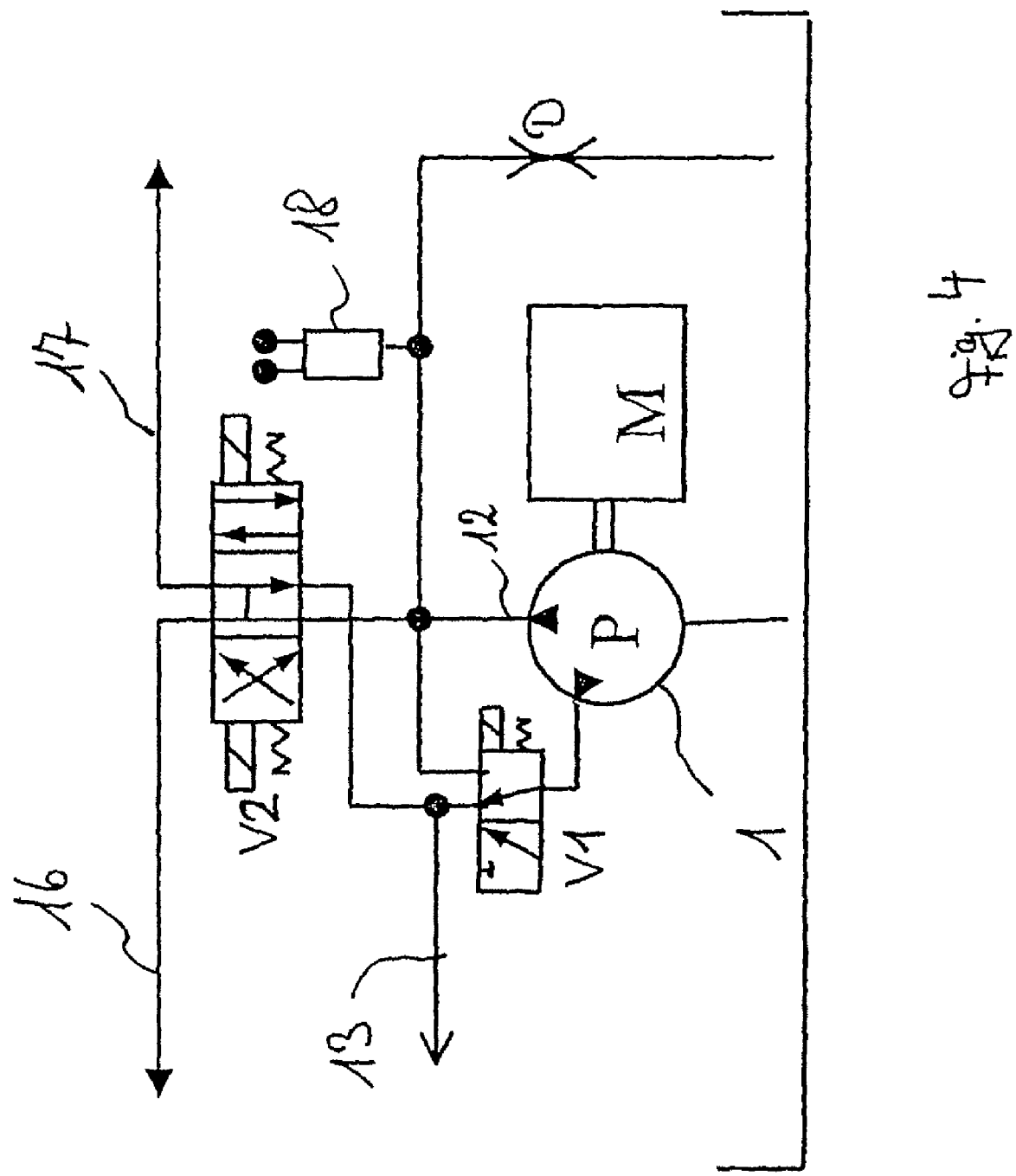
FIG. 4 is another hydraulic circuit for multiple clutches with integrated hydraulic pump.

FIG. 4 shows another embodiment of the incorporation of the hydraulic pump 1 into a lubrication circuit 13 and a first clutch circuit 16 and a second clutch circuit 17. The first valve V1 again makes it possible to connect the lubrication circuit 13 with the clutch circuits 16, 17. A second valve V2 makes it possible to apply pressure to the first clutch circuit 16, while at the same time the second clutch circuit 17 can decrease the pressure that has been built up in the lubrication circuit 13. Moreover, the second valve V2 can be switched such that both clutch circuits 16, 17 can be actuated simultaneously. In addition, it is possible for the first clutch circuit 16 to be connected to the lubrication circuit 13, while the second clutch circuit 17 is simultaneously provided with a volume flow to carry out actuation of a clutch. Switching of the second valve V2 is preferably accomplished through measurement of a characteristic parameter present in the line following the second output stage 11, in particular using a measured pressure. A sensor system 18, in particular a pressure sensor, can once again be provided for this purpose. Although a variety of throttling devices D are contemplated, one embodiment contemplates an adjustable throttling device. Two-port flow regulator or flow control valve, are also contemplated. Preferably, this, too is likewise switched as a function of demand through the control system that is not shown, in particular by the control unit.

Figure 5:
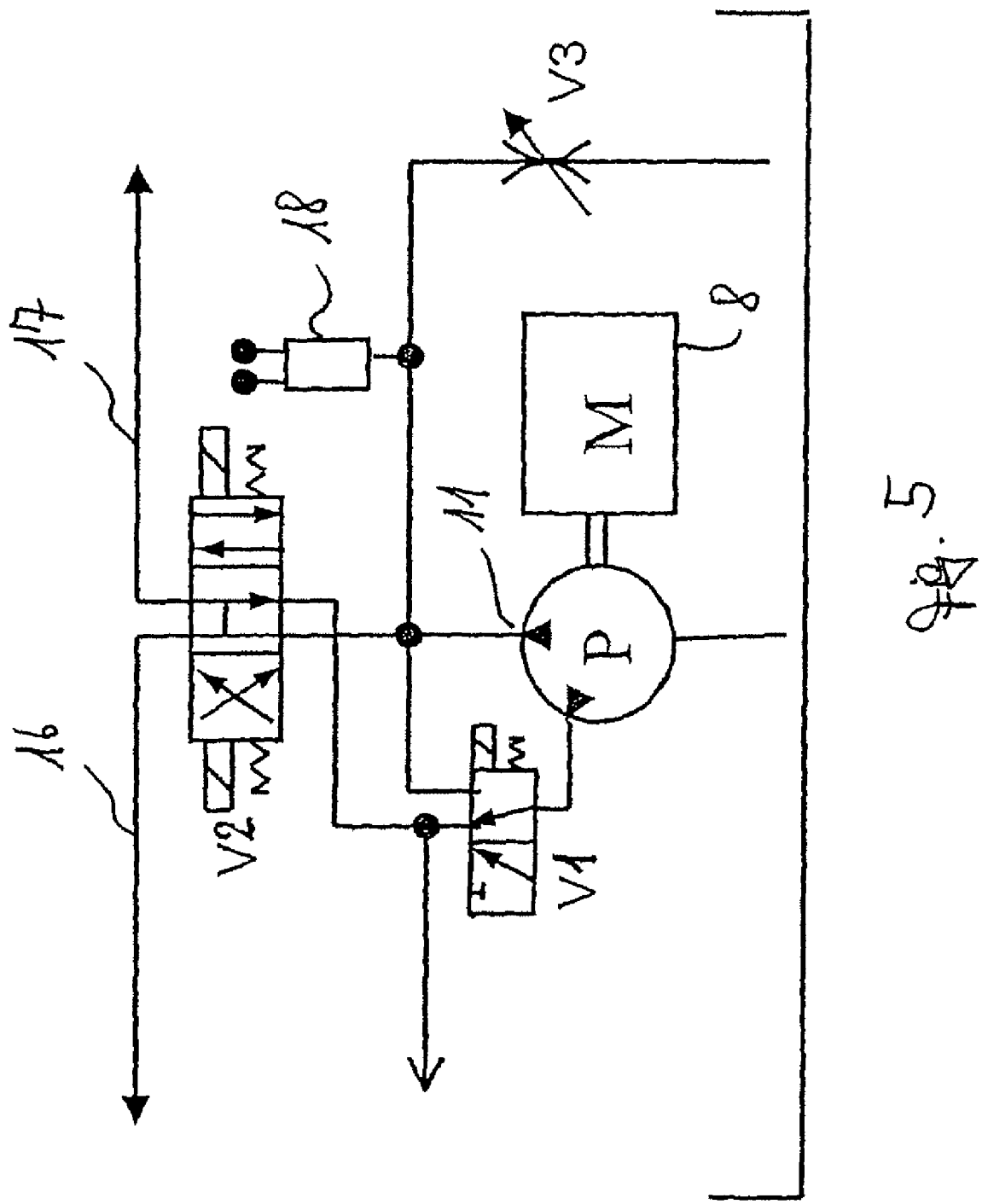
FIG. 5 is a different structure of a hydraulic circuit for multiple clutches with integrated hydraulic pump.

FIG. 5 shows another hydraulic circuit for multiple clutches. In contrast to the embodiment evident from FIG. 4, the further development shown in FIG. 5 provides a proportional valve for pressure regulation as a third valve V3. Pressure relief in the line connected to the second output stage 11 can be accomplished in a controlled or regulated manner with this third valve V3. For regulation, preferably the sensor system 18 is used, by means of which a pressure parameter in the line can be measured, for example. It is also possible for the electric motor 8 to be demand-controlled as a function of the requirements for the first clutch circuit 16 or the second clutch circuit 17. On the other hand, it is possible in this way to switch the third valve V3 in a timed manner.

FIG. 6 again shows a hydraulic circuit for multiple clutches. However, this differs from those in FIG. 4 and FIG. 5. In this embodiment from FIG. 6, it is possible to switch the first clutch circuit 16 fully independently from the second clutch circuit 17. In addition, through the use of two second valves V2, appropriate switching of the first valve V1 can connect the first output stage 10 to the first clutch circuit 16, or to the second clutch circuit 17, or to both clutch circuits 16, 17 at the same time, in order to actuate the clutches. In order to allow disconnection of the connected first output stage 10 by means of the first valve V1, a sensor system 18 is located in each clutch circuit 16, 17. When the clutch (not shown in detail) is to be brought from the pressurized state to the unpressurized state, the respective third valve V3 in each clutch circuit 16, 17 can be actuated. This allows drainage to the reservoir 12. The hydraulic pump 1 thus permits a pressure level as well as a volume flow that is sufficient for at least two independently actuated clutches. In this regard, a control unit can be provided for each clutch. It is also possible for both clutches to be actuated by a common control unit. This control unit is preferably also capable of controlling the hydraulic pump 1 by means of the electric motor 8. The structure proposed in FIG. 6 also allows further utilization of stored hydraulic fluid. For example, if the first clutch circuit 16 is activated, which is to say supplied with hydraulic fluid through the second valve V2, and if the second clutch circuit 17 should now be activated while the first clutch circuit 16 is placed in an inactive state for the clutch, then instead of switching the third valve V3 located in the first clutch circuit 16, the second valve V2 can be switched. The pressure present in the first clutch circuit 16 and the hydraulic fluid then flow into the second clutch circuit 17. Thus, in addition to the connected first output stage 10, the stored pressure force in one of the clutch circuits 16, 17 can also be exploited for faster activation of a clutch.

Figure 6:
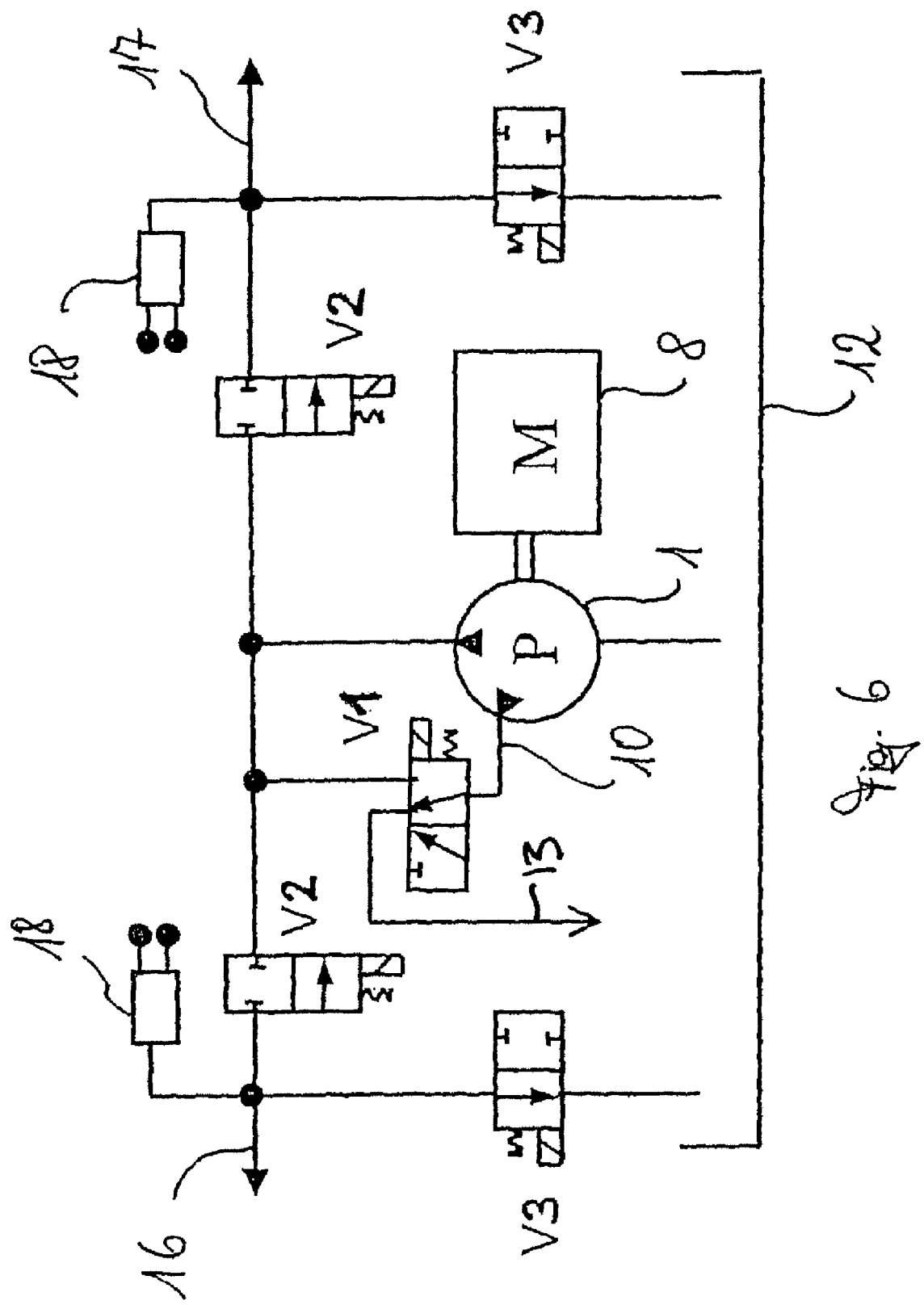
FIG. 6 is a hydraulic circuit for multiple clutches that can be operated fully independently of one another with an integrated hydraulic pump.
Figure 7:
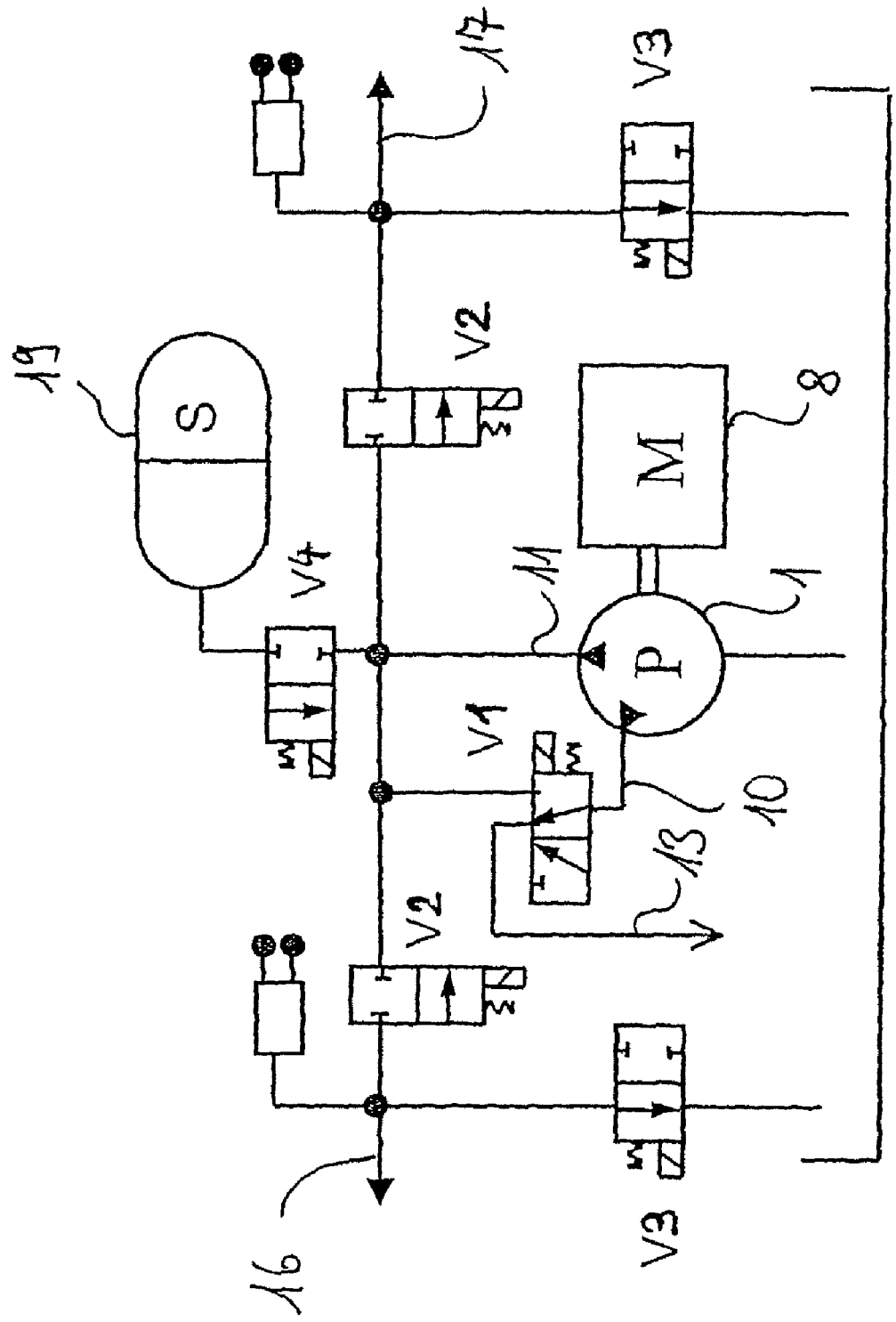
FIG. 7 is a hydraulic circuit with two clutches that can be actuated fully independently of one another, and with integrated accumulator and hydraulic pump.

FIG. 7 is based on the embodiment from FIG. 6. In addition, an accumulator 19 is arranged in series with the hydraulic pump 1. The accumulator 19 can be connected through a fourth valve V4. This makes it possible, for example, for the hydraulic pump 1 to fill the accumulator 19 with hydraulic fluid at times when neither the first clutch circuit 16 nor the second clutch circuit 17 need hydraulic fluid for actuating the respective connected clutches. For example, if a control unit requires both clutches of the clutch circuits 16, 17 to be actuated simultaneously, it is possible to ensure that both clutch circuits 16, 17 are supplied with an adequate volume flow of hydraulic fluid to activate the clutches by connecting the accumulator 19 through the fourth valve V4 while simultaneously connecting the first output stage 10 to the second output stage 11 through the first valve V1. Furthermore, it is possible for the accumulator 19 to be used to actuate a clutch with only the second output stage 11, without connecting the first output stage 10. Moreover, filling of the accumulator 19 can also take place by means of a depressurization of a first clutch circuit 16 or a second clutch circuit 17. The fluid flowing back out of these circuits 16, 17 can be delivered to the accumulator 19 in addition to the hydraulic fluid from the second output stage 11 for appropriate settings of the second valve V2 and the fourth valve V4. Furthermore, the accumulator 19 permits a reduction in the actuation of the electric motor 8 and thus the hydraulic pump 1. For example, the accumulator 19 can permit emergency lubrication, in particular an emergency supply of the lubrication circuit 13. A 2/3-port directional control valve can be used for this purpose, for example.

Figure 8:
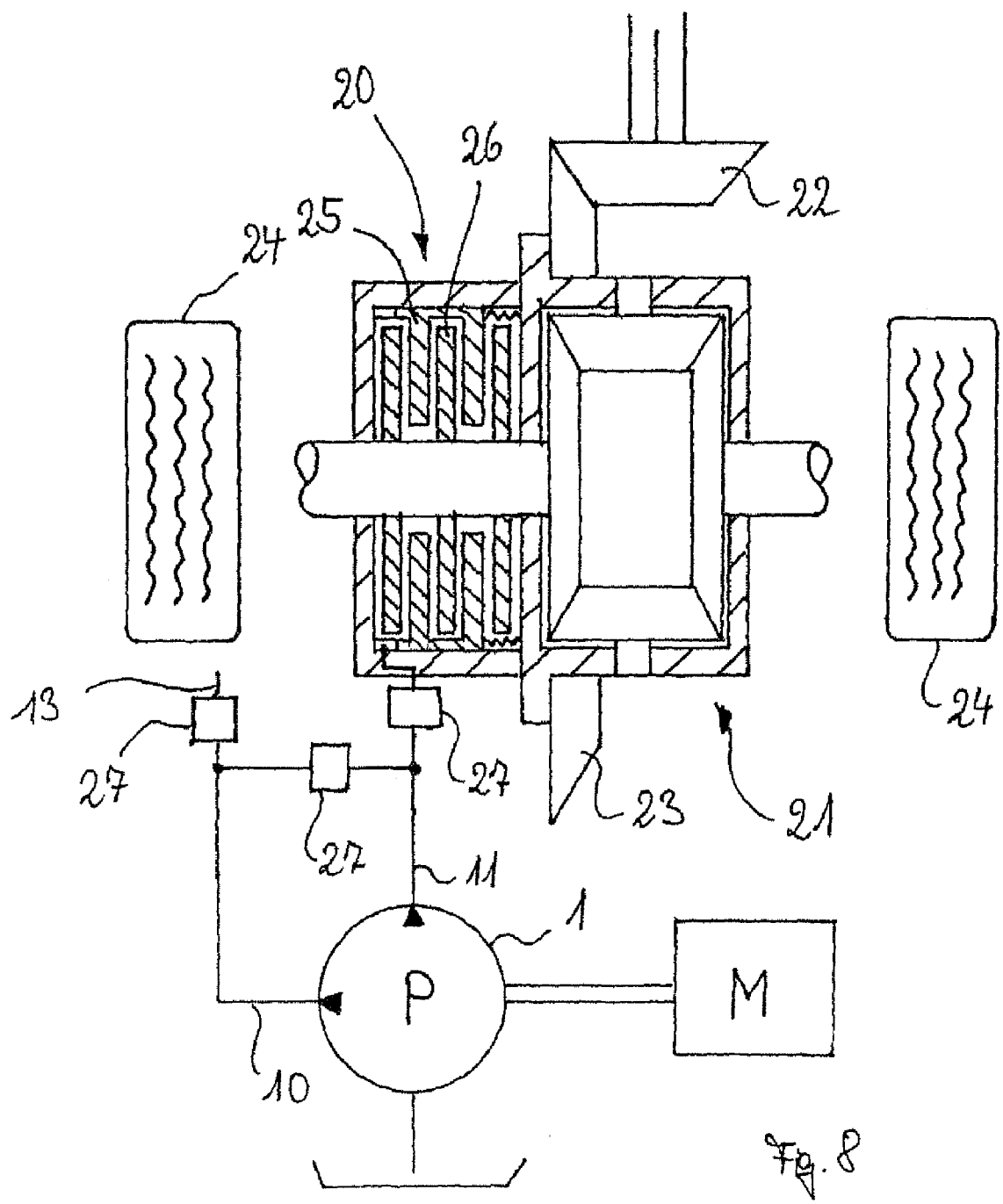
FIG. 8 is an example of a clutch that is actuated by a hydraulic pump and is integrated in a differential of a motor vehicle.

FIG. 8 shows an embodiment of a possible application of the hydraulic pump 1 on a clutch 20 of a differential 21 of a motor vehicle. Power can be transmitted to the wheels 24 through a bevel gear 22, which for example transmits drive power from a drive shaft to the differential 21 by means of, for example, a ring gear 23. The clutch 20 is embodied as a friction plate clutch for this purpose. The differential 21 is an open differential. The coupling of the open differential to the clutch 20 produces a locking differential. By actuating the hydraulic pump 1, outer plates 25 and inner plates 26 can be moved relative to one another. When the pressure in the clutch 20 is increased for this purpose by the hydraulic pump 1 through the delivery of hydraulic fluid, a frictional connection is established between the outer plates 25 and the inner plates 26. For actuation of the clutch, the first output stage 10 can be connected to the second output stage 11 by appropriate valve settings of the various valves 27.

While the invention has been described in connection with one or more embodiments, the disclosure is not meant to be limiting. Rather, the invention covers all alternatives, modifications and equivalents within the spirit and scope of the appended claims.

The invention claimed is:

1. A motor vehicle hydraulic pump for actuating a clutch, comprising:
a gerotor or planetary rotor set; and
at least two output stages;
wherein said at least two output stages comprises a first output stage in communication with a lubrication system a second output stage in communication with at least one clutch for actuating same; and
wherein said first output stage and said second output stage are connected to one another in order to produce a common feed of a volume flow for actuating said at least one clutch.

2. A motor vehicle hydraulic pump as described in claim 1, further comprising a common reservoir including hydraulic fluid, said common reservoir in communication with a clutch lubrication system and an actuator for said clutch.

3. A motor vehicle hydraulic pump as described in claim 1, further comprising a control unit connected to an engine control system by a bus system.

4. A motor vehicle hydraulic pump as described in claim 1, further comprising an electric motor connected to said gerotor or planetary rotor set in a speed-controlled manner in order to produce a delivery volume and delivery pressure.

5. A motor vehicle hydraulic pump as described in claim 1, further comprising a throttling device for adjusting a delivery volume and/or a delivery pressure, said throttling device connected after said at least two output stages.

6. A motor vehicle hydraulic pump as described in claim 1, further comprising an accumulator for hydraulic fluid, coupled to the hydraulic pump, said accumulator selectively connected for an actuation of the clutch.

7. A motor vehicle clutch drive assembly comprising:
a hydraulic pump assembly comprising:
i. a first output stage generating high volume hydraulic fluid flow; and
ii. a second output stage generating high pressure hydraulic fluid flow;
wherein the volume of said high volume hydraulic fluid flow generated by said first output stage is higher than the volume of said high pressure hydraulic fluid flow generated by said second output stage; and
wherein the pressure of said high pressure hydraulic fluid flow generated by said second output stage is higher than the pressure of said high volume hydraulic fluid flow generated by said first output stage.

8. A motor vehicle clutch drive assembly as described in claim 7, further comprising a first valve for selectively interconnecting said first output stage to said second output stage.

9. A motor vehicle clutch drive assembly as described in claim 8, wherein:
said second output stage is in communication with an actuator for a clutch;
said first output stage is in communication with a clutch lubrication system;
said first valve selectively disconnecting said first output stage from said clutch lubrication system and interconnecting said first output stage to said second output stage to facilitate actuation of said clutch.

10. A motor vehicle clutch drive assembly as described in claim 7, further comprising a common reservoir of hydraulic fluid in communication with said first output stage and said second output stage.

11. A motor vehicle clutch drive assembly as described in claim 7, further comprising a throttling device for adjusting delivery volume or delivery pressure in communication with said first output stage and said second output stage.

* * * * *